Aug. 31, 1954  R. BINDER  2,687,627
TORSIONAL OSCILLATION ABSORBER
Filed Aug. 8, 1950  2 Sheets-Sheet 1

INVENTOR:
RICHARD BINDER
BY
Richardson, David and Nordon
Att'ys

Aug. 31, 1954     R. BINDER     2,687,627
TORSIONAL OSCILLATION ABSORBER
Filed Aug. 8, 1950     2 Sheets-Sheet 2
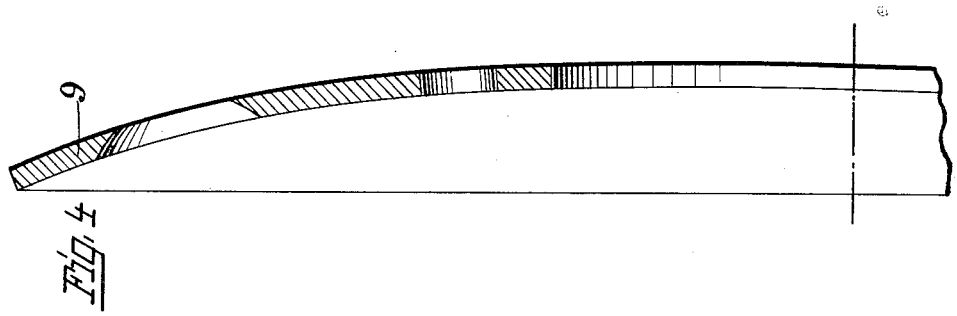
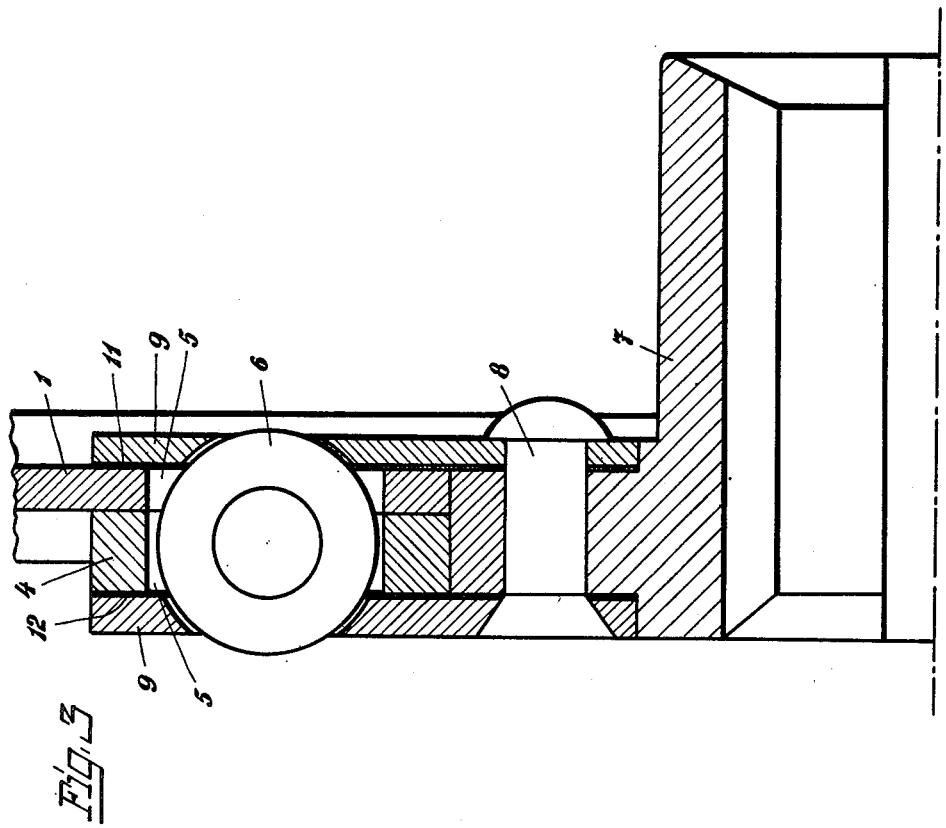
INVENTOR:
RICHARD BINDER

UNITED STATES PATENT OFFICE 2,687,627

TORSIONAL OSCILLATION ABSORBER

Richard Binder, Schweinfurt, Germany, assignor to Fichtel & Sachs A. G., Schweinfurt (Main), Germany, a firm Application August 8, 1950, Serial No. 178,242

Claims priority, application Germany January 24, 1950

1 Claim. (Cl. 64—27)

This invention relates to a torsional oscillation absorber of the type used more particularly in clutches of motor vehicles. Such oscillation absorbers generally operate in such a way that two parts or elements which are relatively rotatable through a predetermined angle against action of a force, e. g., a spring force, frictionally engage each other, the frictional engagement causing a braking action in case of relative rotation of the two parts. Since in operation the forces set up by friction undergo a change owing to alteration of the frictional properties of the rubbing surfaces, the effectiveness of the torsional oscillation absorber is considerably impaired in the course of time.

It is an object of the present invention to provide means by which it is ensured that changes of the frictional forces by alteration of the coefficient of friction which determines the frictional characteristics is avoided.

According to the present invention this problem is solved by providing the frictional surfaces with a phosphate lining. Such a phosphate lining may be provided either on one or on both of the surfaces frictionally engaging each other so that either a phosphatized surface rubs on a metallic or non-metallic surface, or on another phosphatized surface.

Figure 1:
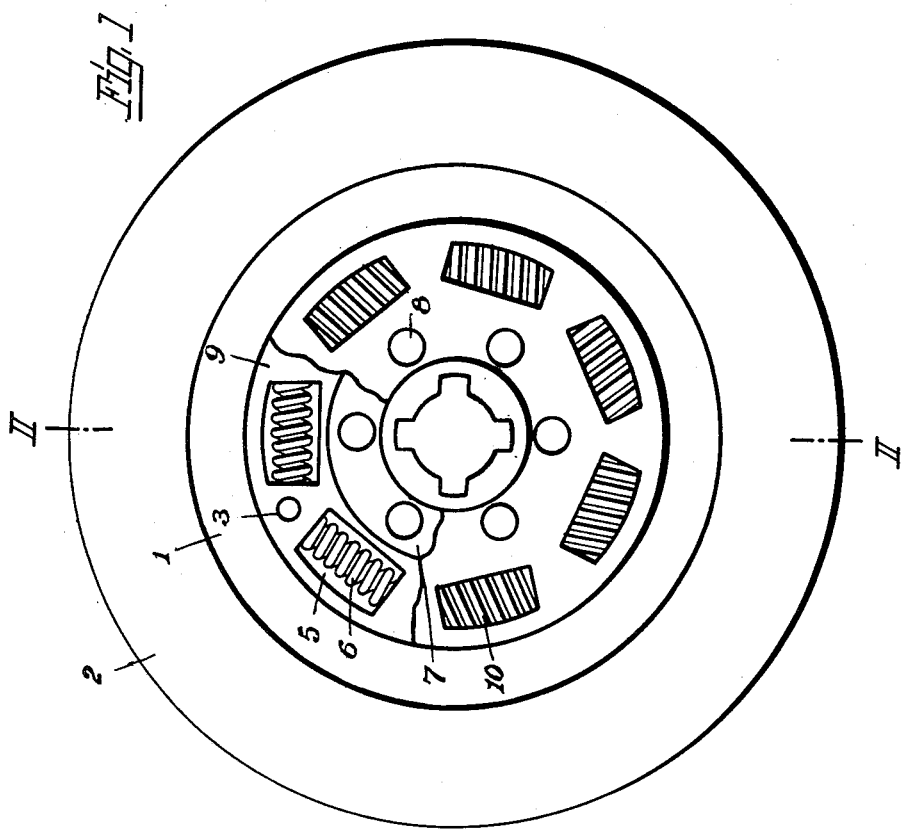
Figure 2:
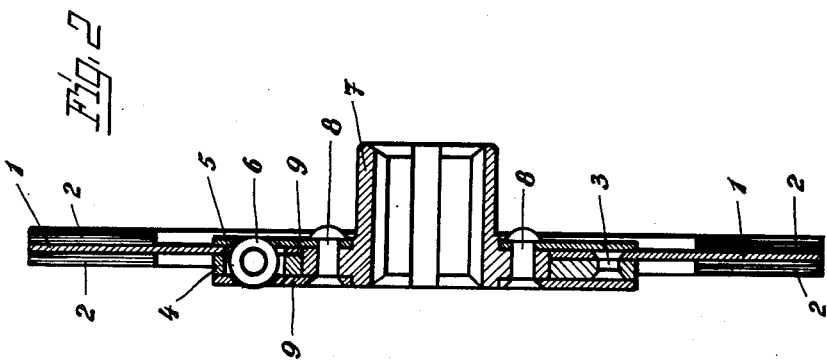

The invention will be better understood by reference to the accompanying drawing showing by way of example one embodiment of the invention in the form of the clutch plate of the clutch of a motor vehicle and in which:

Fig. 1 is a front view, partly in section, of a clutch plate, having the invention applied thereto, Fig. 2 is a section on line II—II of Fig. 1, Fig. 3 is a similar section, on a larger scale, and Fig. 4 is a section of a guide disc shown separately, before the assembling.

Similar reference numerals denote similar parts in the different views.

Referring now to the drawing in greater detail, it will be seen that the clutch plate 1 bearing the clutch linings 2 on both sides, is connected, by rivets 3, with a reinforcing ring 4. The reinforcing ring 4 and the discs 1 are provided with recesses 5 for accommodation of helical springs 6. The clutch plate 1 with the reinforcing ring 4 fixedly connected thereto is mounted on the hub 7 of the disc so as to be rotatable, but, as will be hereinafter explained, its rotation is limited by the helical springs 6.

Fixedly mounted on the hub 7 by means of rivets 8 are guide discs 9 between which the reinforcing ring 4 and the clutch plate 1 are sandwiched. As will be seen from Fig. 4, the guide discs 9 before being assembled are of a vaulted, concave or convex shape; by riveting them on the discs 9 they are flattened so that they engage under pressure on the one hand the clutch plate 1 and on the other hand the ring 4. The two guide discs 9 are provided with recesses 10 registering with the recesses 5 of the ring 4, so that the springs 6 are partly also positioned in the recesses. The springs thus delimit the range of turning of the clutch plate 1 in relation to the hub 7 or the guide discs 9 riveted thereto.

The frictional engagement thus is established between the guide discs 9 on the one hand and the clutch disc 1 and the ring 4 on the other hand. Since the guide discs 9 are under preliminary tension, they will produce friction in known manner.

In order to maintain constant friction in operation, the clutch plate 1 is provided with a phosphate lining or coating 11 which thus is in frictional engagement with the guide disc 9 lying on the right hand side in the drawing. Similarly, the reinforcing ring 4 is unilaterally provided with a phosphate lining 12 on its side frictionally engaging the other guide disc. Thus a uniform friction is maintained between the guide discs 9 on the one side and the clutch plate 1 and the ring 4 on the other side. It may be understood that the guide discs 9 may also be provided with a phosphate lining.

It is also contemplated within the purview of this invention to provide additional springs for pressing the guide discs 9 on to the clutch plate 1 or unto the reinforcing ring 4.

While the invention has been described in detail with respect to a now preferred example and embodiment of the invention it will be understood by those skilled in the art after understanding the invention, that various changes and modifications may be made without departing from the spirit and scope of the invention and it is intended, therefore, to cover all such changes and modifications in the appended claims.

The phosphate coating has the usual composition, i. e. it consists of tertiary and secondary iron phosphate and may be produced, for instance, by dipping the parts to be coated in acid baths containing phosphate, e. g. in acid baths containing phosphate zinc and manganese.

What is claimed is:

Torsional vibration damping means of the class described, comprising: a central hub; a pair of pre-stressed guide discs carried by said hub said discs having recesses formed therein to receive helical compression springs; a clutch plate rotatably supported on said hub and comprising friction surfaces sandwiched between said guide discs for frictional engagement with friction surface portions of said discs, recesses being formed in said clutch plate in register with said recesses in said guide discs; helical compression spring means disposed in said recesses and engaging said clutch plate and said guide discs to yieldingly oppose relative angular movement therebetween; and a phosphate coating carried by at least one of said friction surfaces, said phosphate coating stabilizing and maintaining substantially constant the coefficient of friction of said frictional engagement.

References Cited in the file of this patent

UNITED STATES PATENTS

| Number | Name | Date |
|---|---|---|
| 2,183,130 | Binder | Dec. 12, 1939 |
| 2,191,435 | Ballard et al. | Feb. 27, 1940 |
| 2,224,695 | Prutton | Dec. 10, 1940 |
| 2,277,558 | Nutt | Mar. 24, 1942 |
| 2,296,844 | Glasson | Sept. 29, 1942 |